US012803636B2

(12) United States Patent
Gao

(10) Patent No.: US 12,803,636 B2
(45) Date of Patent: Nov. 17, 2026

(54) METHOD FOR TRANSMITTING SOUNDING REFERENCE SIGNAL (SRS) AND COMMUNICATION DEVICE

(71) Applicant: BEIJING XIAOMI MOBILE SOFTWARE CO., LTD., Beijing (CN)

(72) Inventor: Xueyuan Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 290 days.

(21) Appl. No.: 18/696,342

(22) PCT Filed: Sep. 9, 2021

(86) PCT No.: PCT/CN2021/121961
§ 371 (c)(1),
(2) Date: Mar. 27, 2024

(87) PCT Pub. No.: WO2023/050235
PCT Pub. Date: Apr. 6, 2023

(65) Prior Publication Data

US 2025/0343581 A1 Nov. 6, 2025

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0482* (2013.01); *H04L 5/0044* (2013.01); *H04L 27/261* (2013.01)

(58) Field of Classification Search
CPC ... H04B 7/0482; H04B 7/0626; H04L 27/261; H04L 5/0035; H04L 5/0044;
(Continued)

(56) References Cited

U.S. PATENT DOCUMENTS 10,841,059 B2 11/2020 Park et al.
2019/0190669 A1 6/2019 Park et al.
(Continued)

FOREIGN PATENT DOCUMENTS

CN 109923828 A 6/2019
CN 113286368 A 8/2021
(Continued)

OTHER PUBLICATIONS

Vivo, "Further discussion on Multi-TRP for PDCCH, PUCCH and PUSCH enhancements", 3GPP TSG RAN WG1 #106-e, R1-2106572, e-Meeting, Aug. 16-27, 2021,(28p).
(Continued)

*Primary Examiner* — Eron J Sorrell
(74) *Attorney, Agent, or Firm* — Arch & Lake ILP; Hao Tan; Shen Wang

(57) ABSTRACT

A method for sending a sounding reference signal (SRS) includes: sending SRS configuration information for uplink channel state information (CSI) acquisition to a terminal, the SRS configuration information including one or more SRS resource sets, the one or more SRS resource sets being associated with one or more transmission and reception points (TRPs) for an uplink physical uplink shared channel (PUSCH) transmission, and each SRS resource set comprising at least one SRS resource; and dynamically adjusting a resource configuration of the one or more SRS resource sets according to target information.

14 Claims, 3 Drawing Sheets

(51) Int. Cl.
*H04L 5/00* (2006.01)
*H04L 27/26* (2006.01)

(58) Field of Classification Search
CPC ... H04L 5/0051; H04L 5/0057; H04L 5/0094; H04W 72/04
See application file for complete search history.

(56) References Cited

U.S. PATENT DOCUMENTS

| | | | | |
|---|---|---|---|---|
| 2019/0199497 | A1 | 6/2019 | Park et al. | |
| 2021/0184812 | A1 | 6/2021 | MolavianJazi et al. | |
| 2022/0368485 | A1* | 11/2022 | Levitsky | H04L 5/0094 |
| 2024/0048320 | A1* | 2/2024 | Sun | H04L 5/0051 |

FOREIGN PATENT DOCUMENTS

| | | | | |
|---|---|---|---|---|
| CN | 113286369 | A | 8/2021 | |
| EP | 4243532 | A1 * | 9/2023 | H04B 7/0404 |
| WO | 2020150943 | A1 | 7/2020 | |
| WO | 2021118307 | A1 | 6/2021 | |
| WO | 2021146985 | A1 | 7/2021 | |
| WO | 2021161223 | A1 | 8/2021 | |
| WO | WO-2022011159 | A1 * | 1/2022 | H04B 7/06968 |

OTHER PUBLICATIONS

Ericsson, "On PDCCH, PUCCH and PUSCH enhancements for multi-TRP", 3GPP TSG-RAN WG1 Meeting #106-e, R1-2108074, eMeeting, Aug. 16-27, 2021, (28p).

International Search Reported issued on Application No. PCT/CN2021/121961, date Jun. 29, 2022, with English translation, (4p).

CNOA issued in Application No. 202180002856.0 dated Aug. 7, 2025 with English translation, (17p).

The extended European search report issued in Application No. 21958821.7 dated Jun. 5, 2025, (30p).

* cited by examiner

METHOD FOR TRANSMITTING SOUNDING REFERENCE SIGNAL (SRS) AND COMMUNICATION DEVICE

CROSS REFERENCE TO RELATED APPLICATION

This application is the U.S. national phase application of International Application No. PCT/CN2021/121961, filed on Sep. 29, 2021, the entire contents of which are incorporated herein by reference for all purposes.

TECHNICAL FIELD

The disclosure relates to a field of communication technologies, more particularly, to a method for sending a sounding reference signal (SRS) and an apparatus for sending an SRS.

BACKGROUND

In the uplink enhancement of R17 version, a multi-TRP based physical uplink shared channel (PUSCH) transmission is enhanced. A codebook-based or non-codebook-based transmission can be used for uplink Channel State Information (CSI) acquisition through a sounding reference signal (SRS) configuration. SRS resource sets are associated with different transmission reception points (TRPs) and configured to a terminal through Radio Resource Control (RRC) configuration.

SUMMARY

According to a first aspect of embodiments of the disclosure, a method for sending a sounding reference signal (SRS), performed by a network device, is provided. The method includes:

- sending SRS configuration information used for uplink Channel State Information (CSI) acquisition to a terminal, in which the SRS configuration information includes one or more SRS resource sets, the one or more SRS resource sets are associated with one or more transmission reception points (TRPs) for an uplink physical uplink shared channel (PUSCH) transmission, and each of the SRS resource sets includes at least one SRS resource; and
- dynamically adjusting a resource configuration of the one or more SRS resource sets according to target information.

According to a second aspect of embodiments of the disclosure, a method for sending an SRS, performed by a terminal, is provided. The method includes:

- receiving SRS configuration information used for uplink CSI acquisition sent by a network device, in which the SRS configuration information includes one or more SRS resource sets, the one or more SRS resource sets are associated with one or more TRPs for an uplink PUSCH transmission, and each of the one or more SRS resource sets includes at least one SRS resource; and
- receiving configuration information sent by the network device, in which the configuration information is a resource configuration of the one or more SRS resource sets dynamically adjusted by the network device according to target information.

According to a third aspect of embodiments of the disclosure, a communication device is provided. The communication device includes: a processor and a memory having a computer program stored thereon. The processor executes the computer program stored in the memory, to cause the communication device to implement the method described in the first aspect above.

According to a fourth aspect of embodiments of the disclosure, a communication device is provided. The communication device includes: a processor and a memory having a computer program stored thereon. The processor executes the computer program stored in the memory, to cause the communication device to implement the method described in the second aspect above.

BRIEF DESCRIPTION OF THE DRAWINGS

In order to clearly illustrate technical solutions of embodiments of the disclosure or background technologies, a description of drawings used in the embodiments of the disclosure or the background technologies is given below.

DETAILED DESCRIPTION

Figure 1:
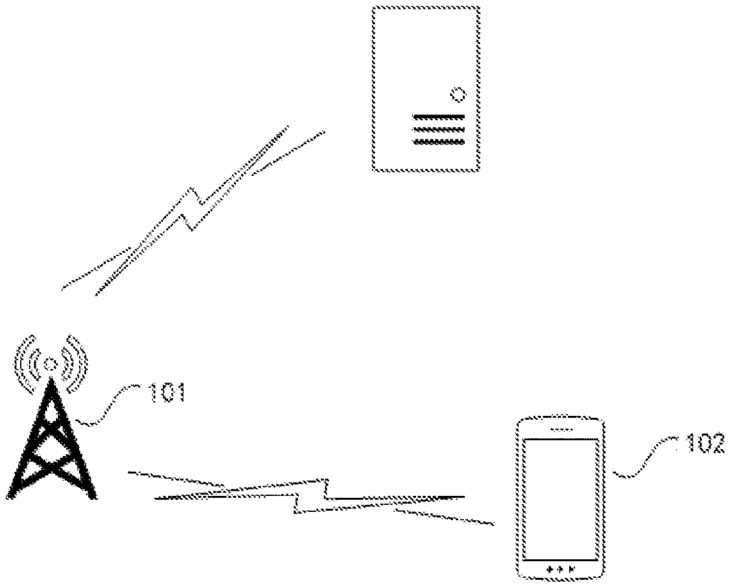
FIG. 1 is a structural diagram of a communication system provided by an embodiment of the disclosure.

Embodiments of the disclosure are described in detail below, examples of which are shown in the accompanying drawings, in which the same or similar numbers represent the same or similar elements or elements with the same or similar functions. The embodiments described below with reference to the drawings are exemplary and are intended to explain the disclosure, and should not be construed as limiting the disclosure. In the description of the disclosure, unless otherwise stated, the character "/" means or. For example, A/B means A or B. The term "and/or" describes a relation of associated objects, which indicates three relations. For example, "A and/or B" indicates that A exists alone, A and B both exist, and B exists alone.

Application of multiple transmission reception points (TRPs)/antenna panels on a base station is to improve a coverage of edges of a cell, to provide more balanced quality of service within a service area, and to transmit data cooperatively among multiple TRPs/panels in multiple ways. From a perspective of network form, network deployment implemented with a large number of distributed access points and centralized baseband processing may be more conducive to providing a balanced user experience rate and significantly reduce latency and signaling overhead caused by handover between cells. Through cooperation among multiple TRPs/panels, transmission/reception of channels can be performed through multiple beams at multiple angles, which can better overcome various blocking/obstruction effects and guarantee robustness of link connection. Therefore, it is suitable for improving transmission quality and meeting a reliability requirement of Ultra-Reliable&Low Latency Communication (URLLC) services.

In a research phase of R16 version, transmission enhancement of a physical downlink shared channel (PDSCH) is performed based on the application of multipoint cooperation transmission technique among multiple downlink TRPs/panels. Data transmission includes scheduling feedback of uplink and downlink channels, thus, in the research of URLLC, only enhancing the downlink data channel cannot guarantee service performance. Therefore, in the research of R17 version, it continues to enhance a physical downlink control channel (PDCCH), a Physical Uplink Control Channels (PUCCH), and a physical uplink shared channel (PUSCH).

In a codebook-based PUSCH transmission in new radio (NR), a terminal may be configured with a maximum of one sounding reference signal (SRS) resource set for a codebook-based uplink transmission, and the SRS resource set can be configured with multiple SRS resources. A network side may feed back an SRS resource indication (SRI) of $\lceil \log_2(N_{SRS})\rceil$ bits, and an SRS resource is selected according to an indication of the SRI. Similarly, based on measurement of uplink channel state information (CSI), the base station finally determines, at the network, a pre-coding matrix indicator (PMI) (e.g. a transmit PMI (TPMI)) and transmission layer number information (e.g. a rank indicator (RI)) used by the terminal in an actual transmission, and notifies them to the terminal. The terminal may pre-code data in a subsequent uplink transmission using the PMI and RI specified by the network side. The pre-coded data is mapped to a corresponding antenna port according to a spatial filter (e.g., SpatialRelationInfo) corresponding to the SRS resource indicated by the SRI. Different SRSs may be transmitted using different spatial filters. Therefore, the pre-coded data of the terminal may be filtered by the spatial filter used by the SRS indicated by the SRI. In this way, the transmission of uplink data from a single layer to full rank can be supported. An example of a method in which the SRI indicates multiple SRS resources is given as Table 1 below.

TABLE 1

SRI indication for codebook-based PUSCH transmission

| Bit field mapped to index | SRI(s), $N_{SRS}$ = 2 |
|---|---|
| 0 | 0 |
| 1 | 1 |

In an NR system, a base station may configure a maximum of one SRS resource set for a non-codebook based uplink transmission for a terminal, which can be realized by configuring one SRS resource set as “noncodebook”. For the non-codebook based uplink transmission, the terminal sends an ability about a maximum number of SRS resources that can be transmitted simultaneously to the base station. The resource set can be configured with a maximum of 4 SRS resources each containing 1 SRS port. The base station may indicate one or more SRS resources used for determination of PUSCH precoding to the terminal via an SRI, and a number of SRS resources corresponding to the SRI is a number of streams of the PUSCH transmission. When the base station configures only 1 SRS resource for the non-codebook uplink transmission for the terminal, downlink control information format 0_1 (DCI format 0_1) does not include the SRI, and the terminal determines the precoding of the PUSCH according to the configured SRS resource.

In the following, examples of SRI tables corresponding to the non-codebook based and codebook-based transmissions in the protocol are provided.

TABLE 7.3.1.1.2-28

SRI for non-codebook based PUSCH transmission, $L_{max}$ = 1

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| | | 2 | 2 | 2 | 2 |
| | | 3 | reserved | 3 | 3 |

TABLE 7.3.1.1.2-29

SRI indication for non-codebook based PUSCH transmission

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
| | | 4 | 0, 2 | 4 | 0, 1 |
| | | 5 | 1, 2 | 5 | 0, 2 |
| | | 6-7 | reserved | 6 | 0, 3 |
| | | | | 7 | 1, 2 |
| | | | | 8 | 1, 3 |
| | | | | 9 | 2, 3 |
| | | | | 10-15 | reserved |

TABLE 7.3.1.1.2-30

SRI indication for non-codebook based PUSCH transmission

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
| | | 4 | 0, 2 | 4 | 0, 1 |
| | | 5 | 1, 2 | 5 | 0, 2 |
| | | 6 | 0, 1, 2 | 6 | 0, 3 |
| | | 7 | reserved | 7 | 1, 2 |
| | | | | 8 | 1, 3 |
| | | | | 9 | 2, 3 |
| | | | | 10 | 0, 1, 2 |
| | | | | 11 | 0, 1, 3 |
| | | | | 12 | 0, 2, 3 |
| | | | | 13 | 1, 2, 3 |
| | | | | 14-15 | reserved |

In a multi-TRP based PUSCH transmission, regardless of the codebook or non-codebook based scheme, a cooperation transmission of two TRPs is supported currently, and one SRS resource set is configured for each TRP and indicated to the terminal via the SRI respectively.

In the uplink enhancement of R17 version, a multi-TRP based PUSCH transmission is enhanced, the codebook or non-codebook based transmission can be used for uplink CSI acquisition through an SRS configuration. SRS resource sets are associated with different TRPs and configured to UE through Radio Resource Control (RRC).

In order to avoid RRC reconfiguration as much as possible, a largest set is generally selected and configured for the UE in an implementation of the related art. This causes large signaling overhead and cannot adapt well to changes in terminal capability and channel/interference. Meanwhile, as the number of antennas increases, the problems of flexibility and signaling overhead may become more prominent. Therefore, an optimal solution may be considered to implement the uplink PUSCH transmission process.

Based on the above problems, embodiments of the disclosure provide a method for sending an SRS for uplink CSI acquisition and an apparatus for sending an SRS for uplink CSI acquisition, which can be performed in a 5G NR system. An SRS resource in an SRS resource sets used for uplink CSI acquisition can be dynamically adjusted to better adapt to changes in terminal capabilities and channel/interference, avoiding RRC reconfiguration, improving system efficiency, and saving system signaling overhead.

In order to better understand the method for sending an SRS for uplink CSI acquisition disclosed in embodiments of the disclosure, a communication system to which the embodiments of the disclosure are applicable is described below at first.

FIG. 1 is a structural diagram of a communication system provided by an embodiment of the disclosure. The communication system may include, but is not limited to, a network device and a terminal. The number and the form of devices illustrated in FIG. 1 are only for examples and do not constitute a limitation on the embodiments of the disclosure, and two or more network devices and two or more terminals may be included in practical applications. The communication system illustrated in FIG. 1 includes, for example, a network device 101 and a terminal 102.

It is noted that the technical solutions of embodiments of the disclosure can be performed in various communication systems, such as, a long term evolution (LTE) system, a 5th generation (5G) mobile communication system, a 5G NR system, or other future new mobile communication systems. It should also be noted that sidelink in embodiments of the disclosure may also be called a side link or a direct link.

The network device 101 in embodiments of the disclosure is an entity on a network side for transmitting or receiving signals. For example, the network device 101 may be an evolved NodeB (eNB), a TRP, a next generation NodeB (gNB) in a NR system, a base station in other future mobile communication systems, or an access node in a wireless fidelity (WiFi) system. The specific technology and specific device form adopted by the network device are not limited in the embodiments of the disclosure. The network device according to embodiments of the disclosure may be composed of a central unit (CU) and distributed units (DUs). The CU may also be called a control unit. The use of the CU-DU structure allows to divide a protocol layer of the network device, such as a base station, such that some functions of the protocol layer are placed in the CU for centralized control, and some or all of the remaining functions of the protocol layer are distributed in the DUs, and the DUs are centrally controlled by the CU.

The terminal 102 in embodiments of the disclosure is an entity on a user side for receiving or transmitting signals, such as a cellular phone. The terminal may also be referred to as a terminal device, user equipment (UE), a mobile station (MS), a mobile terminal (MT), and the like. The terminal can be a car with a communication function, a smart car, a mobile phone, a wearable device, a Pad, a computer with a wireless transceiver function, a virtual reality (VR) terminal, an augmented reality (AR) terminal, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, etc. The specific technology and specific device form adopted by the terminal are not limited in embodiments of the disclosure.

It is understandable that the communication system described in embodiments of the disclosure is intended to clearly illustrate the technical solutions according to embodiments of the disclosure, and does not constitute a limitation on the technical solutions according to embodiments of the disclosure. It is understandable by those skilled in the art that as system architectures evolve and new service scenarios emerge, the technical solutions according to embodiments of the disclosure are also applicable to similar technical problems.

The method for sending an SRS for uplink CSI acquisition and the apparatus for sending an SRS for uplink CSI acquisition may be introduced in detail below with reference to the accompanying drawings.

Figure 2:
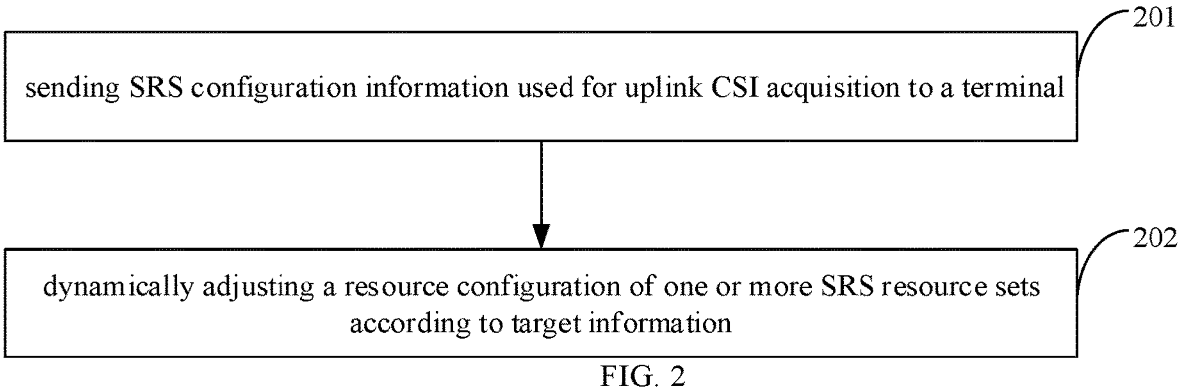
FIG. 2 is a flowchart of a method of sending a sounding reference signal (SRS) for uplink channel state information (CSI) acquisition provided by an embodiment of the disclosure.

FIG. 2 is a flowchart of a method of sending an SRS for uplink CSI acquisition provided by an embodiment of the disclosure. It is noted that the method of sending an SRS for uplink CSI acquisition of the embodiment of the disclosure may be performed by a network device. As shown in FIG. 2, the method may include, but is not limited to, the following steps.

At step 201, SRS configuration information used for uplink CSI acquisition is sent to a terminal.

In embodiments of the disclosure, the SRS configuration information includes one or more SRS resource sets, the one or more SRS resource sets are associated with one or more TRPs for an uplink PUSCH transmission, and each SRS resource set includes at least one SRS resource.

In an implementation, the SRS resource set may be an SRS resource set with a function of codebook or non-codebook. For example, a function parameter value of the SRS resource set may be configured as codebook or non-codebook. Optionally, for the SRS resource sets with the function of "codebook" or "non-codebook" configured by RRC, the SRS resources corresponding to each SRS resource set may be configured. A situation of single TRP transmission or a situation of multi-TRP transmission may be included. Differences in panel capabilities can be considered separately for multi-panel transmission.

In an implementation, corresponding to a single-TRP based PUSCH transmission, the one or more SRS resource sets are configured as one SRS resource set, and the SRS resource set is associated with a single TRP. Or, corresponding to a multi-TRP based PUSCH cooperation transmission, the one or more SRS resource sets are configured as a plurality of SRS resource sets, in which each of the plurality of SRS resource sets is associated with a cooperative TRP, respectively, and a number of SRS resources in an SRS resource set associated with each cooperative TRP is identical or different.

For example, the network device may configure an SRS resource set for codebook-based or non-codebook-based uplink transmission for the terminal. For example, in an NR system, a base station may configure a maximum of one SRS resource set for the non-codebook based uplink transmission for the terminal, which can be realized by configuring one SRS resource set as "noncodebook". For the non-codebook based uplink transmission, the terminal sends an ability about a maximum number of SRS resources that can be transmitted simultaneously to the base station. The resource set can be configured with a maximum of 4 SRS resources each containing 1 SRS port. The base station may indicate one or more SRS resources used for PUSCH precoding determination to the terminal via an SRI, and a number of SRS resources corresponding to the SRI is a number of streams of the PUSCH transmission. When the base station configures only 1 SRS resource for non-codebook uplink transmission for the terminal, DCI format 0_1 does not include the SRI, and the terminal determines the precoding of PUSCH according to the configured SRS resource.

As another example, in the codebook-based PUSCH transmission in the NR system, the terminal may be configured with a maximum of one SRS resource set for the codebook-based uplink transmission, and the SRS resource set can be configured with multiple SRS resources. The network side may feed back an SRI of $\lceil \log_2(N_{SRS}) \rceil$ bits, and an SRS resource is selected according to an indication of the SRI. Similarly, based on measurement of uplink CSI, the base station finally determines, at the network, a PMI (e.g. a TPMI) and transmission layer number information (e.g. an RI) used by the terminal in an actual transmission, and notifies them to the terminal. The terminal may pre-code data in a subsequent uplink transmission using the PMI and RI specified by the network side. The pre-coded data is mapped to a corresponding antenna port according to a spatial filter (e.g., SpatialRelationInfo) corresponding to the SRS resource indicated by the SRI. Different SRSs may be transmitted using different spatial filters. Therefore, the pre-coded data of the terminal may be filtered by the spatial filter used by the SRS indicated by the SRI. In this way, the transmission of uplink data from a single layer to full rank can be supported.

At step 202, a resource configuration of the one or more SRS resource sets is dynamically adjusted according to target information.

In embodiments of the disclosure, the target information may be known configuration information, measurement information, or a measurement report of the terminal. For example, the target information may be a change in beam configuration obtained by beam management sent by the terminal side, a change in a channel estimated by downlink CSI sent by the terminal, a change in an uplink interference situation between users, or an uplink resource allocation situation.

Optionally, the resource configuration of the one or more SRS resource sets can be dynamically adjusted according to the known configuration information, the measurement information, or the measurement report of the terminal. Moreover, which SRS resource configuration or configurations are selected to be activated from the one or more SRS resource sets of the SRS configuration information may be determined. As an example, the network device configures an SRS resource set with a function of “codebook” for the terminal through an RRC signaling. In response to a change in beam configuration obtained by the beam management or a change in a channel estimated by the downlink CSI, the network device can selectively activate the SRS resource configuration or configurations from the configured SRS resource set with the function of “codebook”, to realize the purpose of dynamically adjusting the resource configuration of the SRS resource set, avoiding RRC reconfiguration, and reducing system signaling overhead.

In embodiments of the disclosure, the SRS resources in the one or more SRS resource sets used for uplink CSI acquisition can be dynamically adjusted to better adapt to changes in terminal capabilities and channel/interference, to avoid RRC reconfiguration, improve system efficiency, and save system signaling overhead, and can be better applied to multi-panel transmission based on multi-TRP transmission.

Figure 3:
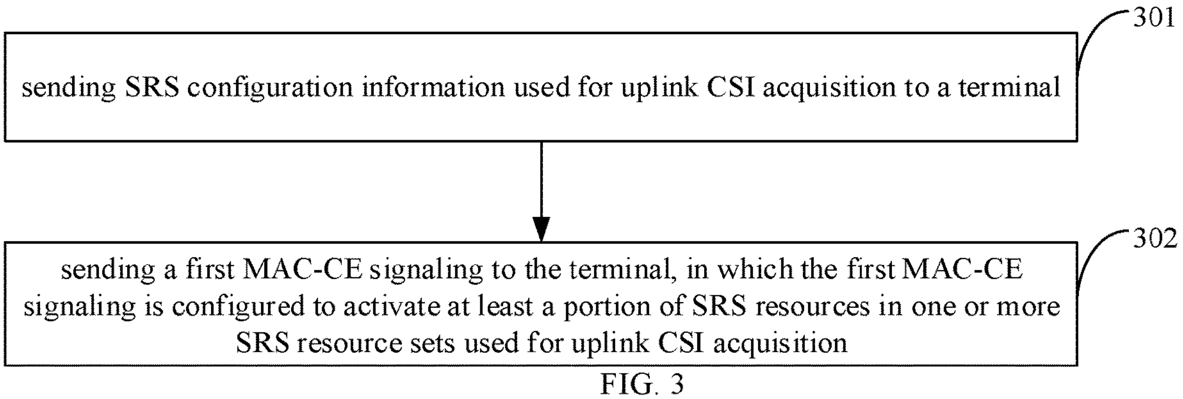
FIG. 3 is a flowchart of a method of sending an SRS for uplink CSI acquisition provided by an embodiment of the disclosure.

In order to be able to further reduce the system signaling overhead, some of the SRS resources in the one or more SRS resource sets configured by the RRC may be activated using a media access control-control element (MAC-CE) signaling. Optionally, in some embodiments, as shown in FIG. 3, the method for sending an SRS for uplink CSI acquisition may include, but is not limited to, the following steps.

At step 301, SRS configuration information used for uplink CSI acquisition is sent to a terminal, in which the SRS configuration information includes one or more SRS resource sets, the one or more SRS resource sets are associated with one or more TRPs for uplink PUSCH transmission, and each of the SRS resource sets includes at least one SRS resource.

In embodiments of the disclosure, step 301 may be realized in any of the embodiments of the disclosure, respectively, which is not limited in embodiments of the disclosure and will not be repeated.

At step 302, a first MAC-CE signaling is sent to the terminal, in which the first MAC-CE signaling is configured to activate at least a portion of SRS resources in the one or more SRS resource sets used for uplink CSI acquisition.

In an implementation, the at least a portion of SRS resources may be SRS resource configurations corresponding to different TRP cooperation transmissions for the PUSCH, and an updated adjusted SRS resource configuration is indicated in a preset manner, in which the preset manner may include any of the following 1) to 4):

1) using a bitmap to indicate corresponding activated SRS resources in each SRS resource set, respectively;
2) using a codepoint to indicate the corresponding activated SRS resources in each SRS resource set, respectively;
3) using a bitmap to jointly indicate corresponding activated SRS resources in all SRS resource sets; or
4) using a codepoint to jointly indicate the corresponding activated SRS resources in all SRS resource sets.

That is, based on the SRS resources in the SRS resource sets corresponding to different target TRP transmissions, the bitmap or codepoint is used to indicate corresponding different SRS resources.

In an implementation, the SRS resource set may include one or more of following types of SRS: a non-periodic SRS, a semi-persistent SRS, or a periodic SRS. For example, the network device may activate, via an MAC-CE signaling, at least some of the SRS resources in a periodic SRS resource set and/or a semi-persistent SRS resource set used for uplink CSI acquisition. For example, the SRS resource set is the periodic SRS resource set, thus the network device may activate at least some of SRS resources in the periodic SRS resource set used for uplink CSI acquisition via the MAC-CE signaling. For a case that the SRS resource set is the semi-persistent SRS resource set, the network device may activate at least some of SRS resources in the semi-persistent SRS resource set used for uplink CSI acquisition via the MAC-CE signaling.

As an example, for the periodic SRS and/or the semi-persistent SRS, the at least a portion of SRS resources may be used as a current SRS resource configuration for uplink CSI acquisition.

Optionally, for a case that the SRS resource set is a non-periodic SRS resource set, the network device may activate at least a portion of SRS resources in the non-periodic SRS resource set used for uplink CSI acquisition via the MAC-CE signaling. In a possible implementation, downlink control information (DCI) may be sent to the terminal, an SRI in the DCI indicates a target SRS resource used for current uplink CSI acquisition, and the target SRS resource includes one or more SRS resources of the at least a portion of SRS resources.

That is, if the SRS resource set is the non-periodic SRS resource set, the network device may use the SRI in the DCI to indicate one or more SRS resources from the at least a portion of SRS resources used for the current uplink CSI acquisition.

In some embodiments of the disclosure, a second MAC-CE signaling may be sent to the terminal. The second MAC-CE signaling may be configured to de-activate an activated SRS resource configuration in an SRS resource set for current uplink CSI acquisition and to use an SRS resource configuration used before receiving the first MAC-CE signaling. That is, the network device may use the second MAC-CE signaling to de-activate the activated SRS resource configuration in the SRS resource set for current uplink CSI acquisition, to restore an initial RRC configuration in effect, e.g., using the SRS resource configuration used before receiving the first MAC-CE signaling.

Figure 4:
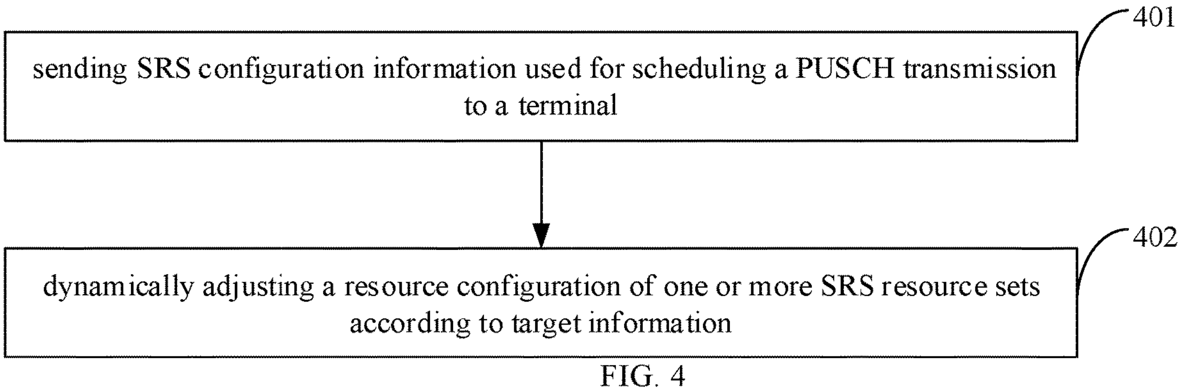
FIG. 4 is a flowchart of a method of sending an SRS provided by an embodiment of the disclosure.

Optionally, the method for dynamically adjusting the SRS resources in the one or more SRS resource sets in the embodiments of the disclosure may also be used for scheduling PUSCH transmission. Optionally, in some embodiments of the disclosure, as shown in FIG. 4, the method for sending an SRS may include, but is not limited to, the following steps.

At step 401, SRS configuration information used for scheduling a PUSCH transmission is sent to a terminal. The SRS configuration information includes one or more SRS resource sets, the one or more SRS resource sets are associated with one or more TRPs for an uplink PUSCH transmission, and each SRS resource set includes at least one SRS resource.

In an implementation, the SRS resource set is an SRS resource set with a function of codebook or non-codebook. Optionally, corresponding to a single-TRP based PUSCH transmission, the one or more SRS resource sets are configured as one SRS resource set, in which the SRS resource set is associated with a single TRP. Or, corresponding to a multi-TRP based PUSCH cooperation transmission, the one or more SRS resource sets are configured as a plurality of SRS resource sets, in which each of the plurality of SRS resource sets is associated with a cooperative TRP, respectively, and a number of SRS resources in an SRS resource set associated with each cooperative TRP is identical or different.

At step 402, a resource configuration of the one or more SRS resource sets is dynamically adjusted according to target information.

In embodiments of the disclosure, the target information may be known configuration information, measurement information, or measurement upload of the terminal. For example, the target information may be a change in beam configuration obtained by beam management sent by the terminal side, a change in a channel estimated by downlink CSI sent by the terminal, a change in an uplink interference situation between users, or an uplink resource allocation situation.

In an implementation, a first MAC-CE signaling is sent to the terminal, the first MAC-CE signaling is configured to activate at least a portion of SRS resources in the one or more SRS resource sets used for scheduling PUSCH transmission.

The at least a portion of SRS resources are SRS resource configurations corresponding to different TRP cooperation transmissions for the PUSCH, and an updated adjusted SRS resource configuration is indicated in a preset manner, in which the preset manner includes any of: using a bitmap to indicate corresponding activated SRS resources in each SRS resource set, respectively; using a codepoint to indicate the corresponding activated SRS resources in each SRS resource set, respectively; using a bitmap to jointly indicate corresponding activated SRS resources in all SRS resource sets; or using a codepoint to jointly indicate the corresponding activated SRS resources in all SRS resource sets.

Optionally, the SRS resource set includes one or more of following types of SRS: a non-periodic SRS, a semi-persistent SRS, or a periodic SRS.

In an implementation, for the periodic SRS and/or the semi-persistent SRS, at least a portion of SRS resources are used as an SRS resource configuration used for scheduling PUSCH transmission.

In a possible implementation, the SRS resource set is a non-periodic SRS resource set, and dynamically adjusting the resource configuration of the one or more SRS resource sets according to the target information includes: sending DCI to the terminal, in which an SRI in the DCI indicates a target SRS resource used for scheduling PUSCH transmission, and the target SRS resource includes one or more SRS resources of the at least a portion of SRS resources.

In some embodiments, a second MAC-CE signaling may be sent to the terminal. The second MAC-CE signaling is configured to de-activate an activated SRS resource configuration in an SRS resource set for scheduling PUSCH transmission and to use an SRS resource configuration used before receiving the first MAC-CE signaling.

In embodiments of the disclosure, the SRS resources in the one or more SRS resource sets used for scheduling PUSCH transmission can be dynamically adjusted to better adapt to changes in terminal capabilities and channel/interference, to avoid RRC reconfiguration, improve system efficiency, and save system signaling overhead, and can be better applied to multi-panel transmission based on multi-TRP transmission.

Figure 5:
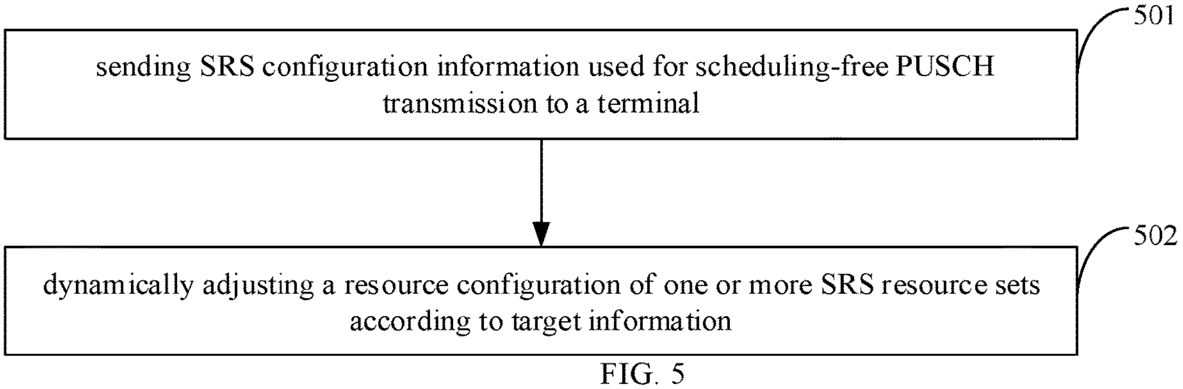
FIG. 5 is a flowchart of a method of sending an SRS provided by an embodiment of the disclosure.

Optionally, the method for dynamically adjusting the SRS resources in the one or more SRS resource sets in the embodiments of the disclosure may also be used for scheduling-free PUSCH transmission. Optionally, in some embodiments of the disclosure, as shown in FIG. 5, the method for sending an SRS may include, but is not limited to, the following steps.

At step 501, SRS configuration information used for scheduling-free PUSCH transmission is sent to the terminal, in which the SRS configuration information includes one or more SRS resource sets, the one or more SRS resource sets are associated with one or more TRPs for scheduling-free PUSCH transmission, and each SRS resource set includes at least one SRS resource.

In an implementation, the SRS resource set is an SRS resource set with a function of codebook or non-codebook. Optionally, corresponding to a single-TRP based PUSCH transmission, the one or more SRS resource sets are configured as one SRS resource set, in which the SRS resource set is associated with a single TRP. Or, corresponding to a multi-TRP based PUSCH cooperation transmission, the one or more SRS resource sets are configured as a plurality of SRS resource sets, in which each of the plurality of SRS resource sets is associated with a cooperative TRP, respectively, and a number of SRS resources in the SRS resource set associated with each cooperative TRP is identical or different.

At step 502, a resource configuration of the one or more SRS resource sets is dynamically adjusted according to target information.

In embodiments of the disclosure, the target information may be known configuration information, measurement information, or measurement report of the terminal. For example, the target information may be a change in beam configuration obtained by beam management sent by the terminal side, a change in a channel estimated by downlink CSI sent by the terminal, a change in an uplink interference situations between users, or an uplink resource allocation situation.

In an implementation, a first MAC-CE signaling is sent to the terminal, and the first MAC-CE signaling is configured to activate at least a portion of SRS resources in the one or more SRS resource sets used for scheduling-free PUSCH transmission.

The at least a portion of SRS resources are SRS resource configurations corresponding to different TRP cooperation transmissions for the PUSCH, and an updated adjusted SRS resource configuration is indicated in a preset manner, in which the preset manner includes any of: using a bitmap to indicate corresponding activated SRS resources in each SRS resource set, respectively; using a codepoint to indicate the corresponding activated SRS resources in each SRS resource set, respectively; using a bitmap to jointly indicate corresponding activated SRS resources in all SRS resource sets; or using a codepoint to jointly indicate the corresponding activated SRS resources in all SRS resource sets.

Optionally, the SRS resource set includes one or more of following types of SRS: a non-periodic SRS, a semi-persistent SRS, or a periodic SRS.

In an implementation, for the periodic SRS and/or the semi-persistent SRS, at least a portion of SRS resources are used as an SRS resource configuration used for scheduling-free PUSCH transmission.

In a possible implementation, the SRS resource set is a non-periodic SRS resource set, and dynamically adjusting the resource configuration of the one or more SRS resource sets according to the target information includes: sending DCI to the terminal, in which an SRI in the DCI indicates a target SRS resource used for scheduling-free PUSCH transmission, and the target SRS resource includes one or more SRS resources of the at least a portion of SRS resources.

In some embodiments, a second MAC-CE signaling may be sent to the terminal. The second MAC-CE signaling is used to de-activate an activated SRS resource configuration in an SRS resource set for scheduling-free PUSCH transmission and to use an SRS resource configuration used before receiving the first MAC-CE signaling.

By implementing the embodiments of the disclosure, the SRS resources in the one or more SRS resource sets used for scheduling-free PUSCH transmission can be dynamically adjusted to better adapt to changes in terminal capabilities and channel/interference, to avoid RRC reconfiguration, improve system efficiency, and save system signaling overhead, and can be better applied to multi-panel transmission based on multi-TRP transmission.

Figure 6:
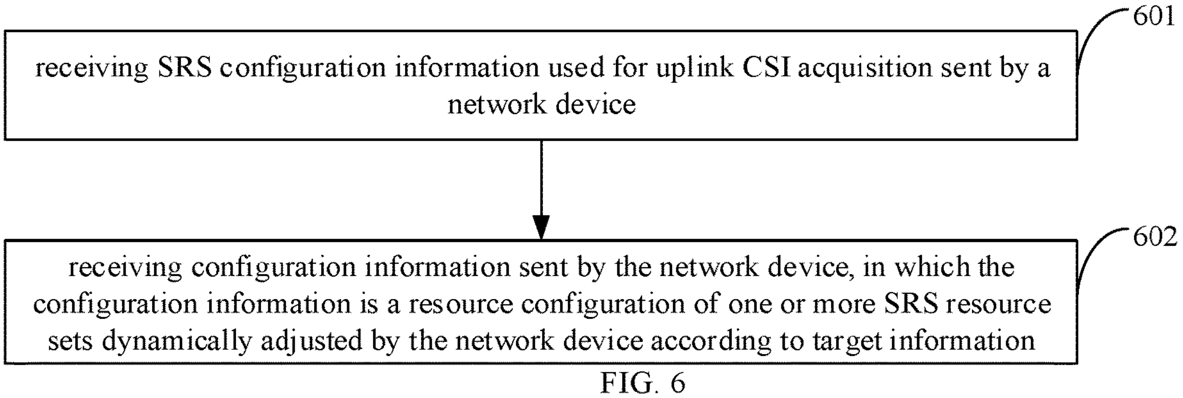
FIG. 6 is a flowchart of a method of sending an SRS provided by an embodiment of the disclosure.

It is understood that the above embodiments describe the implementation of the method for sending an SRS of the embodiments of the disclosure from the network device side. Embodiments of the disclosure also propose a method for sending an SRS, and the following describes the implementation of the method for sending an SRS from the terminal side. As shown in FIG. 6, FIG. 6 is a flowchart of a method for sending an SRS provided by an embodiment of the disclosure. It should be noted that the method for sending an SRS of the embodiments of the disclosure may be performed by a terminal. As shown in FIG. 6, the method for sending an SRS may include, but is not limited to, the following steps.

At step 601, SRS configuration information used for uplink CSI acquisition sent by a network device is received.

In embodiments of the disclosure, the SRS configuration information includes one or more SRS resource sets, the one or more SRS resource sets are associated with one or more TRPs for an uplink PUSCH transmission, and each SRS resource set includes at least one SRS resource.

Optionally, the network device may send the SRS configuration information for uplink CSI acquisition to the terminal. The terminal may receive the SRS configuration information for uplink CSI acquisition sent by the network device.

In an implementation, the SRS resource set may be an SRS resource set with a function of codebook or non-codebook. For example, a function parameter value of the SRS resource set may be configured as codebook or non-codebook. Optionally, for the SRS resource sets with the function of "codebook" or "non-codebook" configured by RRC, the network device may configure the SRS resources corresponding to each the SRS resource set. A situation of single TRP transmission or a situation of multi-TRP transmissions may be included. Differences in panel capabilities can be considered separately for multi-panel transmission. The terminal can receive the SRS resource configuration in the SRS resource sets with the function of "codebook" or "non-codebook" configured by the network device via the RRC.

In an implementation, corresponding to a single-TRP based PUSCH transmission, the one or more SRS resource sets are configured as one SRS resource set, and the SRS resource set is associated with a single TRP. Or, corresponding to a multi-TRP based PUSCH cooperation transmission, the one or more SRS resource sets are configured as a plurality of SRS resource sets, in which each of the plurality of SRS resource sets is associated with a cooperative TRP, respectively, and a number of SRS resources in an SRS resource set associated with each cooperative TRP is identical or different.

For example, the network device may configure an SRS resource set for codebook-based or non-codebook-based uplink transmission for the terminal. For example, in an NR system, a base station may configure a maximum of one SRS resource set for the non-codebook based uplink transmission for the terminal, which can be realized by configuring one SRS resource set as "noncodebook". For the non-codebook based uplink transmission, the terminal sends an ability about a maximum number of SRS resources that can be transmitted simultaneously to the base station. The resource set can be configured with a maximum of 4 SRS resources each containing 1 SRS port. The base station may indicate one or more SRS resources used for PUSCH precoding determination to the terminal via an SRI, and a number of SRS resources corresponding to the SRI is a number of streams of the PUSCH transmission. When the base station configures only 1 SRS resource for the non-codebook uplink transmission for the terminal, DCI format 0_1 does not include the SRI, and the terminal determines the pre-coding of the PUSCH according to the configured SRS resource.

As another example, in the codebook-based PUSCH transmission in the NR system, the terminal may be configured with a maximum of one SRS resource set for the codebook-based uplink transmission, and the SRS resource set can be configured with multiple SRS resources. The network side may feed back an SRI of $\lceil \log_2(N_{SRS}) \rceil$ bits, and an SRS resource is selected according to an indication of the SRI. Similarly, based on measurement of uplink CSI, the base station finally determines, at the network, a PMI (e.g. a TPMI) and transmission layer number information (e.g. an RI) used by the terminal in an actual transmission, and notifies them to the terminal. The terminal may pre-code data in a subsequent uplink transmission using the PMI and RI specified by the network side. The pre-coded data is mapped to a corresponding antenna port according to a spatial filter (e.g., SpatialRelationInfo) corresponding to the SRS resource indicated by the SRI. Different SRSs may be transmitted using different spatial filters. Therefore, the pre-coded data of the terminal may be filtered by the spatial filter used by the SRS indicated by the SRI. In this way, the transmission of uplink data from a single layer to full rank can be supported.

At step 602, configuration information sent by the network device is received, in which the configuration information is a resource configuration of the one or more SRS resource sets dynamically adjusted by the network device according to target information.

Optionally, the network device may dynamically adjust the resource configuration of the one or more SRS resource sets according to the target information. The terminal may receive the configuration information sent by the network device, and the configuration information is the resource configuration of the one or more SRS resource sets dynamically adjusted by the network device according to the target information.

In embodiments of the disclosure, the target information may be known configuration information, measurement information, or a measurement report of the terminal. For example, the target information may be a change in beam configuration obtained by beam management sent by the terminal side, a change in a channel estimated by downlink CSI sent by the terminal, a change in an uplink interference situations between users, or an uplink resource allocation situation.

Optionally, the network device may dynamically adjust the resource configuration of the one or more SRS resource sets according to the known configuration information, the measurement information, or the measurement report of the terminal.

In embodiments of the disclosure, the SRS resources in the one or more SRS resource sets used for uplink CSI acquisition can be dynamically adjusted to better adapt to changes in terminal capabilities and channel/interference, to avoid RRC reconfiguration, improve system efficiency, and save system signaling overhead, and can be better applied to multi-panel transmission based on multi-TRP transmission.

In order to be able to further reduce the system signaling overhead, optionally, the network device may send a first MAC-CE signaling to the terminal. The terminal may receive the first MAC-CE signaling sent by the network device. The first MAC-CE signaling is configured to activate at least a portion of SRS resources in the one or more SRS resource sets used for uplink CSI acquisition. The terminal may receive the first MAC-CE signaling sent by the network device.

In an implementation, the at least a portion of SRS resources may be SRS resource configurations corresponding to different TRP cooperation transmissions for the PUSCH, and an updated adjusted SRS resource configuration is indicated in a preset manner, in which the preset manner may include any of the following 1) to 4):

1) using a bitmap to indicate corresponding activated SRS resources in each SRS resource set, respectively;
2) using a codepoint to indicate the corresponding activated SRS resources in each SRS resource set, respectively;
4) using a bitmap to jointly indicate the corresponding activated SRS resources in all SRS resource sets;
4) using a codepoint to jointly indicate corresponding activated SRS resources in all SRS resource sets.

That is, based on the SRS resources in the SRS resource sets corresponding to different target TRP transmissions, the bitmap or codepoint is used to indicate corresponding different SRS resources.

In an implementation, the SRS resource set may include one or more of following types of SRS: a non-periodic SRS, a semi-persistent SRS, or a periodic SRS. For example, the network device may activate, via an MAC-CE signaling, at least a portion of SRS resources in a periodic SRS resource set and/or a semi-persistent SRS resource set used for uplink CSI acquisition. For example, the SRS resource set is the periodic SRS resource set, thus the network device may activate, via the MAC-CE signaling, at least a portion of SRS resources in a the periodic SRS resource set used for uplink CSI acquisition. For a case that the SRS resource set is the semi-persistent SRS resource set, the network device may activate at least a portion of SRS resources in the semi-persistent SRS resource set used for uplink CSI acquisition via the MAC-CE signaling.

As an example, for the periodic SRS and/or the semi-persistent SRS, the at least a portion of t SRS resources may be used as a current SRS resource configuration for uplink CSI acquisition.

Optionally, for a case that the SRS resource set is a non-periodic SRS resource set, the network device may activate at least a portion of SRS resources in the non-periodic SRS resource set used for uplink CSI acquisition via the MAC-CE signaling. In a possible implementation, DCI may be sent to the terminal, an SRI in the DCI indicates a target SRS resource used for current uplink CSI acquisition, and the target SRS resource includes one or more SRS resources of the at least a portion of SRS resources.

That is, if the SRS resource set is the non-periodic SRS resource set, the network device may use the SRI in the DCI to indicate one or more SRS resources from the at least a portion of SRS resources used for the current uplink CSI acquisition.

In some embodiments of the disclosure, the network device may send a second MAC-CE signaling to the terminal, and the terminal may receive the second MAC-CE signaling sent by the network device. The second MAC-CE signaling may be configured to de-activate an activated SRS resource configuration in an SRS resource set for uplink CSI acquisition and to use an SRS resource configuration used before receiving the first MAC-CE signaling. That is, the network device may use the second MAC-CE signaling to de-activate the activated SRS resource configuration in the SRS resource set for current uplink CSI acquisition, to restore an initial RRC configuration in effect, e.g., using the SRS resource configuration used before receiving the first MAC-CE signaling.

Optionally, the method for dynamically adjusting the SRS resources in the one or more SRS resource sets of the embodiments of the disclosure may also be used for scheduling PUSCH transmissions. Optionally, in some embodiments of the disclosure, the terminal may receive SRS configuration information used for scheduling PUSCH transmission sent by the network device. The SRS configuration information includes one or more SRS resource sets, the one or more SRS resource sets are associated with one or more TRPs for an uplink PUSCH transmission, and each SRS resource set includes at least one SRS resource.

In an implementation, the SRS resource set is an SRS resource set with a function of codebook or non-codebook. Optionally, corresponding to a single-TRP based PUSCH transmission, the one or more SRS resource sets are configured as one SRS resource set, in which the SRS resource set is associated with a single TRP. Or, corresponding to a multi-TRP based PUSCH cooperation transmission, the one or more SRS resource sets are configured as a plurality of SRS resource sets, in which each of the plurality of SRS resource sets is associated with a cooperative TRP, respectively, and a number of SRS resources in an SRS resource set associated with each cooperative TRP is identical or different.

In an implementation, the network device may dynamically adjust a resource configuration of the one or more SRS resource sets according to target information. The terminal may receive configuration information sent by the network device, and the configuration information is the resource configuration of the one or more SRS resource sets dynamically adjusted by the network device according to the target information.

In embodiments of the disclosure, the target information may be known configuration information, measurement information, or measurement upload of the terminal. For example, the target information may be a change in beam configuration obtained by beam management sent by the terminal side, a change in a channel estimated by downlink CSI sent by the terminal, a change in an uplink interference situation between users, or an uplink resource allocation situation.

In an implementation, the terminal may receive a first MAC-CE signaling sent by the network device, and the first MAC-CE signaling is configured to activate at least a portion of SRS resources in the one or more SRS resource sets used for scheduling PUSCH transmission.

The at least a portion of SRS resources are SRS resource configurations corresponding to different TRP cooperation transmissions for the PUSCH, and an updated adjusted SRS resource configuration is indicated in a preset manner, in which the preset manner includes any of: using a bitmap to indicate corresponding activated SRS resources in each SRS resource set, respectively; using a codepoint to indicate the corresponding activated SRS resources in each SRS resource set, respectively; using a bitmap to jointly indicate corresponding activated SRS resources in all SRS resource sets; or using a codepoint to jointly indicate the corresponding activated SRS resources in all SRS resource sets.

Optionally, the SRS resource set includes one or more of following types of SRS: a non-periodic SRS, a semi-persistent SRS, or a period SRS.

In an implementation, for the periodic SRS and/or the semi-persistent SRS, at least a portion of SRS resources are used as an SRS resource configuration used for scheduling PUSCH transmission.

In a possible implementation, the SRS resource set is a non-periodic SRS resource set, and dynamically adjusting the resource configuration of the SRS resource set according to the target information may include following. The terminal receives DCI sent by the network device, in which an SRI in the DCI indicates a target SRS resource used for scheduling PUSCH transmission, and the target SRS resource includes one or more SRS resources of the at least a portion of SRS resources.

In some embodiments, the terminal may receive a second MAC-CE signaling sent by the network device, in which the second MAC-CE signaling is configured to de-activate an activated SRS resource configuration in an SRS resource set for scheduling PUSCH transmission and to use an SRS resource configuration used before receiving the first MAC-CE signaling.

Optionally, the method for dynamically adjusting the SRS resources in the one or more SRS resource sets in the embodiments of the disclosure may also be used for scheduling-free PUSCH transmission. Optionally, in some embodiments of the disclosure, the terminal may receive SRS configuration information for scheduling-free PUSCH transmission sent by the network device. The SRS configuration information may include one or more SRS resource sets, the one or more SRS resource sets are associated with one or more TRPs for scheduling-free PUSCH transmission, and each SRS resource set includes at least one SRS resource.

In an implementation, the SRS resource set is an SRS resource set with a function of codebook or non-codebook. Optionally, corresponding to a single-TRP based PUSCH transmission, the one or more SRS resource sets are configured as one SRS resource set, in which the SRS resource set is associated with a single TRP. Or, corresponding to a multi-TRP based PUSCH cooperation transmission, the one or more SRS resource sets are configured as a plurality of SRS resource sets, in which each of the plurality of SRS resource sets is associated with a cooperative TRP, respectively, and a number of SRS resources in the SRS resource set associated with each cooperative TRP is identical or different.

In some embodiments, the network device may dynamically adjust a resource configuration of the one or more SRS resource sets according to target information. The terminal may receive configuration information sent by the network device, and the configuration information is the resource configuration of the one or more SRS resource sets dynamically adjusted by the network device according to the target information. In embodiments of the disclosure, the target information may be known configuration information, measurement information, or measurement report of the terminal. For example, the target information may be a change in beam configuration obtained by beam management sent by the terminal side, a change in a channel estimated by downlink CSI sent by the terminal, a change in an uplink interference situations between users, or an uplink resource allocation situation.

In an implementation, the terminal may receive a first MAC-CE signaling sent by the network device, and the first MAC-CE signaling is configured to activate at least a portion of SRS resources in the one or more SRS resource sets used for scheduling-free PUSCH transmission.

The at least a portion of SRS resources are SRS resource configurations corresponding to different TRP cooperation transmissions for the PUSCH, and an updated adjusted SRS resource configuration is indicated in a preset manner, in which the preset manner includes any of: using a bitmap to indicate corresponding activated SRS resources in each SRS resource set, respectively; using a codepoint to indicate the corresponding activated SRS resources in each SRS resource set, respectively; using a bitmap to jointly indicate corresponding activated SRS resources in all SRS resource sets; or using a codepoint to jointly indicate the corresponding activated SRS resources in all SRS resource sets.

Optionally, the SRS resource set includes one or more of following types of SRS: a non-periodic SRS, a semi-persistent SRS, or a periodic SRS.

In an implementation, for the periodic SRS and/or the semi-persistent SRS, the at least a portion of SRS resources are used as an SRS resource configuration for scheduling-free PUSCH transmission.

In a possible implementation, the SRS resource set is a non-periodic SRS resource set, and dynamically adjusting the resource configuration of the one or more SRS resource sets according to the target information may include followings. The terminal may receive DCI sent by the network device, in which an SRI in the DCI indicates a target SRS resource used for scheduling-free PUSCH transmission, and the target SRS resource includes one or more SRS resources of the at least a portion of SRS resources.

In some embodiments, the terminal receives a second MAC-CE signaling sent by the network device. The second MAC-CE signaling is used to de-activate an activated SRS resource configuration in an SRS resource set for scheduling-free PUSCH transmission and to use an SRS resource configuration used before receiving the first MAC-CE signaling.

By implementing the embodiments of the disclosure, the SRS resources in the one or more SRS resource sets used for scheduling-free PUSCH transmission can be dynamically adjusted to better adapt to changes in terminal capabilities and channel/interference, to avoid RRC reconfiguration, improve system efficiency, and save system signaling overhead, and can be better applied to multi-panel transmission based on multi-TRP transmission.

In the above embodiments of the disclosure, the method provided in the embodiments of the disclosure is described from the perspectives of the network device and the terminal, respectively. In order to implement each of the above-described functions in the method provided by the embodiments of the disclosure, the network device and the terminal may include a hardware structure or a software module, and implement each of the above-described functions in the form of a hardware structure, a software module, or a combination of the hardware structure and the software module. A certain function of the above functions may be performed in the form of a hardware structure, a software module, or a combination of the hardware structure and the software module.

Embodiments of the disclosure provide a communication device. The communication device has an ability to implement part or all of the functions of the network device or the terminal in the method described in the above method embodiments. For example, the communication device may have functions of some or all of the embodiments of the disclosure, or may have a function of independently implementing any embodiment of the disclosure. The functions can be implemented by hardware, or can be implemented by executing corresponding software using the hardware. The hardware or software includes one or more units or modules corresponding to the above functions.

Figure 7:
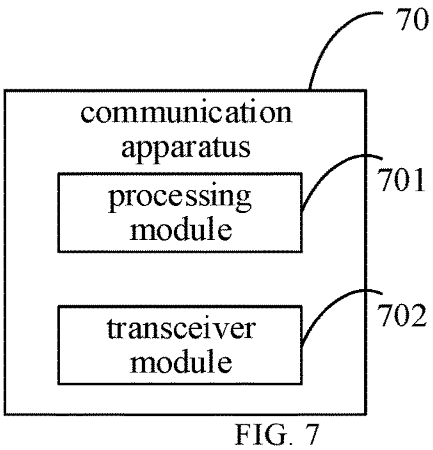
FIG. 7 is a schematic diagram of a communication device provided by an embodiment of the disclosure.

FIG. 7 is a schematic diagram of a communication device 70 provided by an embodiment of the disclosure. The communication device 70 shown in FIG. 7 may include a transceiver module 701 and a processing module 702. The transceiver module 701 may include a sending module and/or a receiving module. The sending module is configured to realize a sending function, and the receiving module is configured to realize a receiving function. The transceiver module 701 may realize the sending function and/or the receiving function. The processing module is configured to support the communication device to perform corresponding functions in the above methods. The transceiver module is configured to support communication between the communication device and other devices. The communication device may further include a storage module coupled to the transceiver module and the processing module, and is configured to store necessary computer programs and data for the communication device.

As an example, the processing module may be a processor. The transceiver module may be a transceiver or a communication interface. The storage module may be a memory.

The communication device 70 may be a terminal, an apparatus in the terminal, or an apparatus capable of being used in combination with the terminal. Alternatively, the communication device 70 may be a network device, an apparatus in the network device, or a device capable of being used in combination with the network device.

The communication device 70 is a network device. In embodiments of the disclosure, the transceiver module 701 is configured to send SRS configuration information used for uplink CSI acquisition to a terminal, in which the SRS configuration information includes one or more SRS resource sets, the one or more SRS resource sets are associated with one or more TRPs for an uplink PUSCH transmission, and each of the one or more SRS resource sets includes at least one SRS resource. The processing module 702 is configured to dynamically adjust a resource configuration of the one or more SRS resource sets according to target information.

In an implementation, the one or more SRS resource sets are an SRS resource set with a function of codebook or non-codebook.

In an implementation, corresponding to a single-TRP based PUSCH transmission, the one or more SRS resource sets are configured as one SRS resource set, in which the SRS resource set is associated with a single TRP; or, corresponding to a multi-TRP based PUSCH cooperation transmission, the one or more SRS resource sets are configured as a plurality of SRS resource sets, in which each of the plurality of SRS resource sets is associated with a cooperative TRP, respectively, and a number of SRS resources in an SRS resource set associated with each cooperative TRP is identical or different.

In an implementation, the processing module 702 is configured to send a first MAC-CE signaling to the terminal, in which the first MAC-CE signaling is configured to activate at least a portion of SRS resources in the one or more SRS resource sets used for uplink CSI acquisition.

In an implementation, the at least a portion of SRS resources are SRS resource configurations corresponding to different TRP cooperation transmissions for the PUSCH, and an updated adjusted SRS resource configuration is indicated in a preset manner, in which the preset manner includes any of: using a bitmap to indicate corresponding activated SRS resources in each SRS resource set, respectively; using a codepoint to indicate the corresponding activated SRS resources in each SRS resource set, respectively; using a bitmap to jointly indicate corresponding activated SRS resources in all SRS resource sets; using a codepoint to jointly indicate the corresponding activated SRS resources in all SRS resource sets.

In an implementation, the one or more SRS resource sets include one or more of: a non-periodic SRS, a semi-persistent SRS, or a periodic SRS.

In an implementation, for the periodic SRS and/or the semi-persistent SRS, the at least a portion of SRS resources are used as a current SRS resource configuration for uplink CSI acquisition.

In an implementation, the one or more SRS resource sets are a non-periodic SRS resource set, and the processing module 702 is configured to: send DCI to the terminal, in which an SRI in the DCI indicates a target SRS resource used for current uplink CSI acquisition, and the target SRS resource includes one or more SRS resources of the at least a portion of SRS resources.

In an implementation, the transceiver module 701 is configured to: send a second MAC-CE signaling to the terminal, in which the second MAC-CE signaling is configured to de-activate an activated SRS resource configuration in an SRS resource set for current uplink CSI acquisition and to use an SRS resource configuration used before receiving the first MAC-CE signaling.

In an implementation, the transceiver module 701 is configured to: send SRS configuration information used for scheduling PUSCH transmission to the terminal; or, send SRS configuration information used for scheduling-free PUSCH transmission to the terminal.

The communication device 70 is a terminal. In embodiments of the disclosure, the transceiver module 701 is configured to: receive SRS configuration information used for uplink CSI acquisition sent by a network device, in which the SRS configuration information includes one or more SRS resource sets, the one or more SRS resource sets are associated with one or more TRPs for an uplink PUSCH transmission, and each of the one or more SRS resource sets includes at least one SRS resource. The transceiver module 701 is configured to: receive configuration information sent by the network device, in which the configuration information is a resource configuration of the one or more SRS resource sets dynamically adjusted by the network device according to target information.

In an implementation, the one or more SRS resource sets are an SRS resource set with a function of codebook or non-codebook.

In an implementation, corresponding to a single-TRP based PUSCH transmission, the one or more SRS resource sets are configured as one SRS resource set, in which the SRS resource set is associated with a single TRP; or, corresponding to a multi-TRP based PUSCH cooperation transmission, the one or more SRS resource sets are configured as a plurality of SRS resource sets, in which each of the plurality of SRS resource sets is associated with a cooperative TRP, respectively, and a number of SRS resources in the an SRS resource set associated with each cooperative TRP is identical or different.

In an implementation, the transceiver module 701 is configured to: receive a first MAC-CE signaling sent by the network device, in which the first MAC-CE signaling is configured to activate at least a portion of SRS resources in the one or more SRS resource sets used for uplink CSI acquisition.

In an implementation, the at least a portion of SRS resources are SRS resource configurations corresponding to different TRP cooperation transmissions for the PUSCH, and an updated adjusted SRS resource configuration is indicated in a preset manner, in which the preset manner includes any of: using a bitmap to indicate corresponding activated SRS resources in each SRS resource set, respectively; using a codepoint to indicate the corresponding activated SRS resources in each SRS resource set, respectively; using a bitmap to jointly indicate corresponding activated SRS resources in all SRS resource sets; using a codepoint to jointly indicate the corresponding activated SRS resources in all SRS resource sets.

In an implementation, the one or more SRS resource sets include one or more of: a non-periodic SRS, a semi-persistent SRS, or a periodic SRS.

In an implementation, for the periodic SRS and/or the semi-persistent SRS, the at least a portion of SRS resources are used as a current SRS resource configuration for uplink CSI acquisition.

In an implementation, the one or more SRS resource sets are a non-periodic SRS resource set, and the transceiver module 701 is configured to: receive DCI sent by the network device, in which an SRI in the DCI indicates a target SRS resource used for current uplink CSI acquisition, and the target SRS resource includes one or more SRS resources of the at least a portion of SRS resources.

In an implementation, the transceiver module 701 is configured to: receive a second MAC-CE signaling sent by the network device, in which the second MAC-CE signaling is configured to de-activate an activated SRS resource configuration in an SRS resource set for current uplink CSI acquisition and to use an SRS resource configuration used before receiving the first MAC-CE signaling.

In an implementation, the transceiver module 701 is configured to: receive SRS configuration information used for scheduling PUSCH transmission sent by the network device; or, receive SRS configuration information used for scheduling-free PUSCH transmission sent by the network device.

With respect to the apparatus in the above embodiments, the specific manner in which each module performs an operation has been described in detail in the embodiments related to the method, and will not be described in detail herein.

Figure 8:
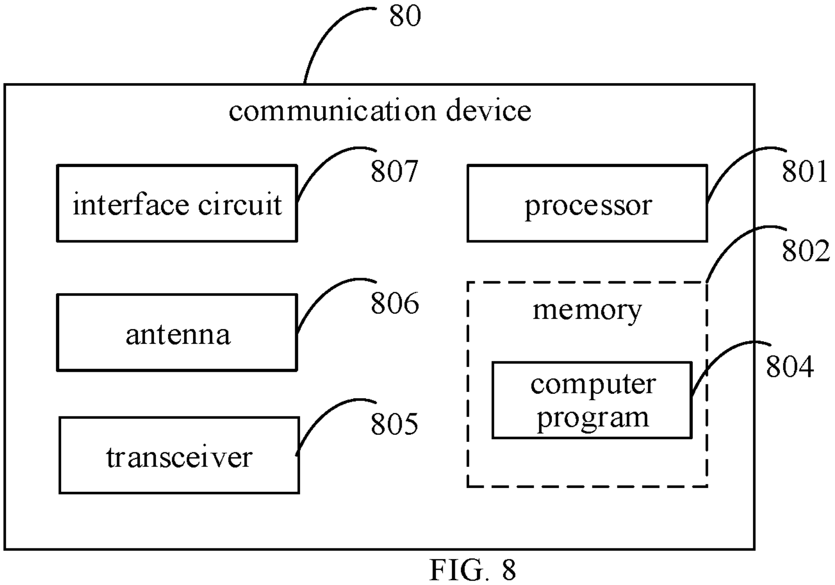
FIG. 8 is a schematic diagram of a communication device provided by an embodiment of the disclosure.

FIG. 8 is a schematic diagram of a communication device 80 provided by an embodiment of the disclosure. The communication device 80 may be a network device or a terminal, or may be a chip, a chip system or a processor that supports the network device to realize the above-described methods, or may be a chip, a chip system or a processor that supports the terminal to realize the above-described methods. The device may be used to realize the methods described in the above method embodiments with reference to the description of the above-described method embodiments.

The communication device 80 may include one or more processors 801. The processor 801 may be a general purpose processor or a dedicated processor, such as, a baseband processor and a central processor. The baseband processor is used for processing communication protocols and communication data. The central processor is used for controlling the communication device (e.g., a base station, a baseband chip, a terminal, a terminal chip, a DU, or a CU), executing computer programs, and processing data of the computer programs. When the processor calls a computer program stored in a memory, the method described in any of the above embodiments is implemented.

Optionally, the communication device 80 may include one or more memories 802 on which computer programs 804 may be stored. The processor 801 executes the computer programs 804 to cause the communication device 80 to perform the methods described in the above method embodiments. Optionally, the memory 802 may store data. The communication device 80 and the memory 802 may be provided separately or may be integrated together.

Optionally, the communication device 80 may also include a transceiver 805 and an antenna 806. The transceiver 805 may be referred to as a transceiver unit, a transceiver machine, or a transceiver circuit, for realizing a transceiver function. The transceiver 805 may include a receiver and a transmitter. The receiver may be referred to as a receiving machine or a receiving circuit, for realizing the receiving function. The transmitter may be referred to as a transmitter machine or a transmitting circuit, for realizing the transmitting function.

Optionally, the communication device 80 may also include one or more interface circuits 807. The interface circuits 807 are used to receive code instructions and transmit them to the processor 801. The processor 801 runs the code instructions to cause the communication device 80 to perform the method described in the method embodiments.

The communication device 1500 is a network device. The processor 801 is used to perform step 202 in FIG. 2, step 402 in FIG. 4, and step 502 in FIG. 5. The transceiver 805 is used to perform step 201 in FIG. 2, steps 301 and 302 in FIG. 3, step 401 in FIG. 4, and step 501 in FIG. 5.

The communication device 80 is a terminal. The transceiver 805 is used to perform steps 601 and 602 in FIG. 6.

In an implementation, the processor 801 may include a transceiver for implementing the receiving and sending functions. The transceiver may be, for example, a transceiver circuit, an interface, or an interface circuit. The transceiver circuit, the interface, or the interface circuit for implementing the receiving and sending functions may be separated or may be integrated together. The transceiver circuit, the interface, or the interface circuit described above may be used for reading and writing code/data, or may be used for signal transmission or delivery.

In an implementation, the processor 801 may store a computer program 803. When the computer program 803 runs on the processor 801, the communication device 80 is caused to perform the methods described in the method embodiments above. The computer program 803 may be solidified in the processor 801, and in such case the processor 801 may be implemented by hardware.

In an implementation, the communication device 80 may include circuits. The circuits may implement the sending, receiving or communicating function in the preceding method embodiments. The processor and the transceiver described in this disclosure may be implemented on integrated circuits (ICs), analog ICs, radio frequency integrated circuits (RFICs), mixed signal ICs, application specific integrated circuits (ASICs), printed circuit boards (PCBs), and electronic devices. The processor and the transceiver can also be produced using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs) and so on.

The communication device in the description of the above embodiments may be a network device or a terminal (e.g., the terminal in the preceding method embodiments), but the scope of the communication device described in the disclosure is not limited thereto, and the structure of the communication device may not be limited by FIG. 8. The communication device may be a stand-alone device or may be part of a larger device. For example, the described communication device may be:

(1) a stand-alone IC, a chip, a chip system or a subsystem;
(2) a collection of ICs including one or more ICs, optionally, the collection of ICs may also include storage components for storing data and computer programs;
(3) an ASIC, such as a modem;
(4) a module that can be embedded within other devices;
(5) a receiver, a terminal, a smart terminal, a cellular phone, a wireless device, a handheld machine, a mobile unit, an in-vehicle device, a network device, a cloud device, an artificial intelligence device, and the like; and
(6) others.

It is understood by those skilled in the art that various illustrative logical blocks and steps listed in the embodiments of the disclosure may be implemented by electronic hardware, computer software, or a combination of both. Whether such function is implemented by hardware or software depends on the particular application and the design requirements of the entire system. Those skilled in the art may, for each particular application, use various methods to implement the described function, but such implementation should not be understood as beyond the scope of protection of the embodiments of the disclosure.

Embodiments of the disclosure also provide a system. The system includes a communication device acting as a terminal and a communication device acting as a network device in the aforementioned embodiment of FIG. 7. Alternatively, it includes a communication device acting as a terminal and a communication device acting as a network device in the aforementioned embodiment of FIG. 8.

The disclosure also provides a readable storage medium having instructions stored thereon. When the instructions are executed by a computer, the function of any of the method embodiments described above is implemented.

The disclosure also provides a computer program product. When the computer program product is executed by a computer, the function of any of the method embodiments described above is implemented.

The above embodiments may be implemented in whole or in part by software, hardware, firmware, or any combination thereof. When implemented using software, the above embodiments may be implemented, in whole or in part, in the form of a computer program product. The computer program product includes one or more computer programs. When loading and executing the computer program on the computer, all or part of processes or functions described in the embodiments of the disclosure is implemented. The computer may be a general-purpose computer, a dedicated computer, a computer network, or other programmable devices. The computer program may be stored in a computer-readable storage medium or transmitted from one computer-readable storage medium to another computer-readable storage medium. For example, the computer program may be transmitted from one web site, computer, server, or data center to another web site, computer, server, or data center, in a wired manner (e.g., using coaxial cables, fiber optics, or digital subscriber lines (DSLs) or wireless manner (e.g., using infrared wave, wireless wave, or microwave). The computer-readable storage medium may be any usable medium to which the computer is capable to access or a data storage device such as a server integrated by one or more usable mediums and a data center. The usable medium may be a magnetic medium (e.g., a floppy disk, a hard disk, and a tape), an optical medium (e.g., a high-density digital video disc (DVD)), or a semiconductor medium (e.g., a solid state disk (SSD)).

Those skilled in the art can understand that the first, second, and other various numerical numbers involved in the disclosure are only described for the convenience of differentiation, and are not used to limit the scope of the embodiments of the disclosure, or used to indicate the order of precedence.

The term "at least one" in the disclosure may also be described as one or more, and the term "multiple" may be two, three, four, or more, which is not limited in the disclosure. In the embodiments of the disclosure, for a type of technical features, "first", "second", and "third", and "A", "B", "C" and "D" are used to distinguish different technical features of the type, the technical features described using the "first", "second", and "third", and "A", "B", "C" and "D" do not indicate any order of precedence or magnitude.

The correspondences shown in the tables in this disclosure may be configured or may be predefined. The values of information in the tables are merely examples and may be configured to other values, which are not limited by the disclosure. In configuring the correspondence between the information and the parameter, it is not necessarily required that all the correspondences illustrated in the tables must be configured. For example, the correspondences illustrated in certain rows in the tables in this disclosure may not be configured. For another example, the above tables may be adjusted appropriately, such as splitting, combining, and the like. The names of the parameters shown in the titles of the above tables may be other names that can be understood by the communication device, and the values or representations of the parameters may be other values or representations that can be understood by the communication device. Each of the above tables may also be implemented with other data structures, such as, arrays, queues, containers, stacks, linear tables, pointers, chained lists, trees, graphs, structures, classes, heaps, and Hash tables.

The term "predefine" in this disclosure may be understood as define, define in advance, store, pre-store, pre-negotiate, pre-configure, solidify, or pre-fire.

Those skilled in the art may realize that the units and algorithmic steps of the various examples described in combination with the embodiments disclosed herein are capable of being implemented in the form of electronic hardware, or a combination of computer software and electronic hardware. Whether these functions are performed in the form of hardware or software depends on the specific application and design constraints of the technical solution. Those skilled in the art may use different methods to implement the described functions for each particular application, but such implementations should not be considered as beyond the scope of the disclosure.

It is clearly understood by those skilled in the field to which it belongs that, for the convenience and brevity of description, the specific working processes of the systems, apparatuses, and units described above can be referred to the corresponding processes in the preceding method embodiments, and will not be repeated herein.

The above are only specific implementations of the disclosure, but the scope of protection of the disclosure is not limited thereto. Those skilled in the art familiar to this technical field can easily think of changes or substitutions in the technical scope disclosed by the disclosure, which shall be covered by the scope of protection of the disclosure. Therefore, the scope of protection of the disclosure shall be governed by the scope of protection of the appended claims.

What is claimed is:

1. A method for sending a sounding reference signal (SRS), comprising:

sending, by a network device, SRS configuration information used for uplink channel state information (CSI) acquisition to a terminal, wherein the SRS configuration information comprises one or more SRS resource sets, the one or more SRS resource sets are associated with one or more transmission reception points (TRPs) for an uplink physical uplink shared channel (PUSCH) transmission, and each of the one or more SRS resource sets comprises at least one SRS resource; and dynamically adjusting, by the network device, a resource configuration of the one or more SRS resource sets according to target information;

wherein dynamically adjusting the resource configuration of the one or more SRS resource sets according to the target information comprises:

sending a first media access control-control element (MAC-CE) signaling to the terminal, wherein the first MAC-CE signaling activating a portion of SRS resources in the one or more SRS resource sets used for uplink CSI acquisition;

wherein the portion of SRS resources are SRS resource configurations corresponding to different TRP cooperation transmissions for the PUSCH, and an updated adjusted SRS resource configuration is indicated in a preset manner, wherein the preset manner comprises any of followings: using a bitmap to indicate corresponding activated SRS resources in each SRS resource set, respectively; using a codepoint to indicate the corresponding activated SRS resources in each SRS resource set, respectively; using a bitmap to jointly indicate corresponding activated SRS resources in all SRS resource sets; or using a codepoint to jointly indicate the corresponding activated SRS resources in all SRS resource sets; and sending, by the network device, a second MAC-CE signaling to the terminal, wherein the second MAC-CE signaling is configured to de-activate an activated SRS resource configuration in an SRS resource set for current uplink CSI acquisition and use an SRS resource configuration used before receiving the first MAC-CE signaling.

2. The method of claim 1, wherein the one or more SRS resource sets are an SRS resource set with a function of codebook or non-codebook.

3. The method of claim 1, wherein corresponding to a single-TRP based PUSCH transmission, configuring the one or more SRS resource sets as one SRS resource set, wherein the one SRS resource set is associated with a single TRP; or, corresponding to a multi-TRP based PUSCH cooperation transmission, configuring the one or more SRS resource sets as a plurality of SRS resource sets, wherein each of the plurality of SRS resource sets is associated with a cooperative TRP respectively, and a number of SRS resources in an SRS resource set associated with each cooperative TRP is identical or different.

4. The method of claim 1, wherein the one or more SRS resource sets comprise one or more of following SRSs:

a non-periodic SRS;

a semi-persistent SRS; or a periodic SRS.

5. The method of claim 4, wherein for the periodic SRS or the semi-persistent SRS, the portion of SRS resources are used as an adjusted SRS resource configuration for uplink CSI acquisition; or wherein the one or more SRS resource sets are a non-periodic SRS resource set, and dynamically adjusting the resource configuration of the one or more SRS resource sets according to the target information comprises:

sending downlink control information to the terminal, wherein an SRS resource indication (SRI) in the downlink control information indicates a target SRS resource used for current uplink CSI acquisition, and the target SRS resource comprises one or more SRS resources of the portion of SRS resources.

6. The method of claim 1, wherein sending the SRS configuration information used for uplink CSI acquisition to the terminal comprises one of followings:

sending SRS configuration information used for scheduling PUSCH transmission to the terminal; or, sending SRS configuration information used for scheduling-free PUSCH transmission to the terminal.

7. A method for sending a sounding reference signal (SRS), comprising:

receiving, by a terminal, SRS configuration information used for uplink channel state information (CSI) acquisition sent by a network device, wherein the SRS configuration information comprises one or more SRS resource sets, the one or more SRS resource sets are associated with one or more transmission reception points (TRPs) for an uplink physical uplink shared channel (PUSCH) transmission, and each of the one or more SRS resource sets comprises at least one SRS resource;

receiving, by the terminal, configuration information sent by the network device, wherein the configuration information is a resource configuration of the one or more SRS resource sets dynamically adjusted by the network device according to target information;

receiving a first media access control-control element (MAC-CE) signaling sent by the network device, wherein the first MAC-CE signaling activating a portion of SRS resources in the one or more SRS resource sets used for uplink CSI acquisition; wherein the portion of SRS resources are SRS resource configurations corresponding to different TRP cooperation transmissions for the PUSCH, and an updated adjusted SRS resource configuration is indicated in a preset manner, wherein the preset manner comprises any of followings: using a bitmap to indicate corresponding activated SRS resources in each SRS resource set, respectively; using a codepoint to indicate the corresponding activated SRS resources in each SRS resource set, respectively; using a bitmap to jointly indicate corresponding activated SRS resources in all SRS resource sets; or using a codepoint to jointly indicate the corresponding activated SRS resources in all SRS resource sets; and receiving, by the terminal, a second MAC-CE signaling sent by the network device, wherein the second MAC-CE signaling is configured to de-activate an activated SRS resource configuration in an SRS resource set for current uplink CSI acquisition and use an SRS resource configuration used before receiving the first MAC-CE signaling.

8. The method of claim 7, wherein the one or more SRS resource sets are an SRS resource set with a function of codebook or non-codebook.

9. The method of claim 7, wherein corresponding to a single-TRP based PUSCH transmission, configuring the one or more SRS resource sets as one SRS resource set, wherein the one SRS resource set is associated with a single TRP; or, corresponding to a multi-TRP based PUSCH cooperation transmission, configuring the one or more SRS resource sets as a plurality of SRS resource sets, wherein each of the plurality of SRS resource sets is associated with a cooperative TRP, respectively, and a number of SRS resources in an SRS resource set associated with each cooperative TRP is identical or different.

10. The method of claim 7, wherein the one or more SRS resource sets comprise one or more of following SRSs:

a non-periodic SRS;

a semi-persistent SRS; or a periodic SRS.

11. The method of claim 10, wherein for the periodic SRS or the semi-persistent SRS, the portion of SRS resources are used as an adjusted SRS resource configuration for uplink CSI acquisition; or wherein the one or more SRS resource sets are a non-periodic SRS resource set, and the method further comprises:

receiving downlink control information sent by the network device, wherein an SRS resource indication (SRI) in the downlink control information indicates a target SRS resource used for current uplink CSI acquisition, and the target SRS resource comprises one or more SRS resources of the portion of SRS resources.

12. The method of claim 7, wherein receiving the SRS configuration information used for uplink CSI acquisition sent by the network device comprises one of followings:

receiving SRS configuration information used for scheduling PUSCH transmission sent by the network device; or, receiving SRS configuration information used for scheduling-free PUSCH transmission sent by the network device.

13. A communication device, comprising a processor and a memory having a computer program stored thereon, wherein the processor is configured to:

receive SRS configuration information used for uplink channel state information (CSI) acquisition sent by a network device, wherein the SRS configuration information comprises one or more SRS resource sets, the one or more SRS resource sets are associated with one or more transmission reception points (TRPs) for an uplink physical uplink shared channel (PUSCH) transmission, and each of the one or more SRS resource sets comprises at least one SRS resource;

receive configuration information sent by the network device, wherein the configuration information is a resource configuration of the one or more SRS resource sets dynamically adjusted by the network device according to target information;

receive a first media access control-control element (MAC-CE) signaling sent by the network device, wherein the first MAC-CE signaling activating a portion of SRS resources in the one or more SRS resource sets used for uplink CSI acquisition; wherein the portion of SRS resources are SRS resource configurations corresponding to different TRP cooperation transmissions for the PUSCH, and an updated adjusted SRS resource configuration is indicated in a preset manner, wherein the preset manner comprises any of followings: using a bitmap to indicate corresponding activated SRS resources in each SRS resource set, respectively; using a codepoint to indicate the corresponding activated SRS resources in each SRS resource set, respectively; using a bitmap to jointly indicate corresponding activated SRS resources in all SRS resource sets; or using a codepoint to jointly indicate the corresponding activated SRS resources in all SRS resource sets; and receive, by the terminal, a second MAC-CE signaling sent by the network device, wherein the second MAC-CE signaling is configured to de-activate an activated SRS resource configuration in an SRS resource set for current uplink CSI acquisition and use an SRS resource configuration used before receiving the first MAC-CE signaling.

14. A communication device, comprising a processor and a memory having a computer program stored thereon, wherein the processor is configured to perform the method of claim 1.

* * * * *